United States Patent [19]
Getgen

[11] 3,836,720
[45] Sept. 17, 1974

[54] COMBINATION HYBRID AND SWITCHING CIRCUIT AND METHOD UTILIZING RESONANT TRANSFER

[75] Inventor: Lawrence E. Getgen, Redwood City, Calif.

[73] Assignee: Armour-Moore Marine Service Limited, Surrey, England

[22] Filed: Nov. 16, 1973

[21] Appl. No.: 416,479

Related U.S. Application Data

[63] Continuation-in-part of Ser. No. 349,572, April 9, 1973, and a continuation-in-part of Ser. No. 392,720, Aug. 29, 1973.

[52] U.S. Cl....... 179/15 FD, 178/58 R, 179/15 AA, 179/18 FC
[51] Int. Cl............................................... H04j 1/06
[58] Field of Search......... 179/15 FD, 15 FS, 2.5 R, 179/15 A, 15 AA, 170 NC, 18 FC; 178/58 R

[56] References Cited

FOREIGN PATENTS OR APPLICATIONS 1,258,905 1/1968 Germany........................ 179/15 AA

OTHER PUBLICATIONS

IBM Journal, March 1965, "A New Method for Frequency Division Multiplexing...," P.M. Thrasher, pp. 137–140.

Transmission Systems for Communications, Staff, Bell Telephone Laboratories, Copyright 1959, pp. 5–1 to 5–17.

*Primary Examiner*—David L. Stewart
*Attorney, Agent, or Firm*—Leonard R. Cool; Russell A. Cannon; T. C. Jay, Jr.

[57] ABSTRACT

A two-way communication terminal having a plurality of lines and resonant transfer means for effecting selective hybrid separation of any of the lines into unidirectional transmission and receive paths. Sampling gates are mounted in the lines and paths and cofunction to simultaneously produce the hybrid and line switching functions. Where several hybrids are used, the resonant transfer filters in the transmit and receive paths may be bandpass filters selecting different portions of the frequency spectrum to thus take advantage of a phenomenon inherent in the circuit to provide frequency division multiplexing of the hybrid paths.

14 Claims, 8 Drawing Figures

| COUNT | WORD | | | | |
|---|---|---|---|---|---|
| 1 | 1 | 1 | 0 | 0 | 1 |
| 2 | 1 | 1 | 1 | 0 | 0 |
| 3 | 1 | 1 | 1 | 1 | 0 |
| 4 | 1 | 1 | 1 | 1 | 1 |
| 5 | 0 | 1 | 1 | 1 | 1 |
| 6 | 0 | 0 | 1 | 1 | 1 |
| 7 | 0 | 0 | 0 | 1 | 1 |
| 8 | 1 | 0 | 0 | 0 | 1 |
| 9 | 1 | 1 | 0 | 0 | 0 |
| 10 | 0 | 1 | 1 | 0 | 0 |
| 11 | 1 | 0 | 1 | 1 | 0 |
| 12 | 1 | 1 | 0 | 1 | 1 |
| 13 | 1 | 1 | 1 | 0 | 1 |
| 14 | 0 | 1 | 1 | 1 | 0 |
| 15 | 1 | 0 | 1 | 1 | 1 |
| 16 | 0 | 1 | 0 | 1 | 1 |
| 17 | 1 | 0 | 1 | 0 | 1 |
| 18 | 0 | 1 | 0 | 1 | 0 |
| 19 | 0 | 0 | 1 | 0 | 1 |
| 20 | 0 | 0 | 0 | 1 | 0 |
| 21 | 0 | 0 | 0 | 0 | 1 |
| 22 | 1 | 0 | 0 | 0 | 0 |
| 23 | 0 | 1 | 0 | 0 | 0 |
| 24 | 0 | 0 | 1 | 0 | 0 |
| 25 | 1 | 0 | 0 | 1 | 0 |

COMBINATION HYBRID AND SWITCHING CIRCUIT AND METHOD UTILIZING RESONANT TRANSFER

CROSS-REFERENCE TO RELATED APPLICATIONS

The present application is a continuation-in-part of my applications Ser. No. 349,572 filed Apr. 9, 1973, for TIME DIVISION HYBRID CIRCUIT AND METHOD, and of my application Ser. No. 392,720 filed Aug. 29, 1973, for COMBINATION HYBRID AND FREQUENCY DIVISION MULTIPLEXING CIRCUIT AND METHOD.

BACKGROUND OF THE INVENTION

1. Field of the Invention

The invention relates to two-way communication systems, to the use of hybrid circuits therein for separating line signals into unidirectional transmit and receive paths, to line switching circuits, and to the simultaneous transmission of a plurality of line signals over common channels by frequency division multiplexing. The present invention has application in the communication field in the area of telephone switching systems and in the area of telephone carrier equipment of the type known as carrier-concentrators.

2. Description of the Prior Art

Switching systems are used in the communication field to interconnect pairs of telephone subscribers to form telephone transmission paths in response to requests for service. A telephone central office is an example of a switching system. An example of a telephone switching system with fewer subscriber terminations is the private automatic branch exchange (PABX) used by businesses, hotels, motels, and the like. The switching function is most frequently accomplished by means of relays of one type or another. Also switching is normally 2-wire to 2-wire, that is, with a single 2-wire path established between subscribers. Such an interconnection does not distinguish between the directions of transmission, and no unidirectional gain devices can be placed in the transmission path.

Hybrid circuits are used in telephone and other communication systems for separating the normal two-way line communication into individual, unidirectional paths, commonly referred to as the transmit and receive paths, for signals emanating from the oppoite ends of the line. One of the important uses of the hybrid circuit is for the introduction into either or both of the transmit and receive paths of amplifiers, which are inherently unidirectional, for restoring the strength of signals attenuated by transmission losses.

Conventional hybrids are of the transformer type operating on the principle of magnetic field balancing or cancellation. Such hybrids ideally have a 3 dB loss in the transmission path since one-half of the transmitted power is always lost either in the balancing network for the receive-to-line direction of transmission or in the receive line termination for the line-to-transmit direction of transmission. Practically, the transmission loss is higher, usually in the order of about 4.5 dB. Furthermore, the transhybrid loss, that is, the loss from the receive port to the transmit port, of a conventional hybrid depends upon the hybrid balance, which in turn depends upon the matching of the hybrid balance network to the termination at the line port and upon the perfection of magnetic coupling in the transformer. Finally, it may be noted that transformers and relays are bulky, expensive, and aside from low inherent losses, require, in the case of relays, significant power during the switching operation.

A third requirement in communication systems, particularly those operating over some distance, is the need for multiplexing the signals so as to obtain the transmission of many simultaneous messages over a common high frequency line or radio, or microwave transmission link. Customarily, the several unidirectional or bidirectional messages will be modulated to occupy different frequency allocations in the transmitted frequency spectrum. This of course requires the use of modulators at the transmitting end and demodulators at the receiving end of the line.

Various attempts have been made to simplify and in some instances combine circuits for providing the switching and multiplexing functions, see for example the paper by P. N. Thrasher, *IBM Journal*, Mar. 1965, entitled "A New Method for Frequency-Division Multiplexing and Its Integration With Time Division Switching." Attempts to avoid use of conventional transformer type hybrids are illustrated in U.S. Pat. No. 3,745,253 and U.S. Pat. No. 3,745,256. None of these proposals disclose a hybridswitching frequency division multiplexing configuration.

SUMMARY OF THE INVENTION

The resonant transfer hybrid disclosed in application Ser. No. 349,572 has as a principal feature thereof an arrangement wherein power losses are substantially eliminated. Additionally, the circuit components are greatly simplified and reduced essentially to resonant transfer filters, gates, and a resonant transfer inductor.

In accordance with the present invention, sampling gates are mounted in the lines and hybrid paths and cofunction to simultaneously provide the hybrid and line switching functions. The present circuit has a very wide bandwidth capability limited only by the speed of operation of the gates and is much greater than that obtainable with the conventional hybrid. Of particular significance also is the fact that the signals at the transmit and receive ports of the hybrid need not be at the same frequency as the line signal, and advantage is taken of an operating phenomenon present in the instant circuit to obtain frequency division multiplexing by the simple expedient of selecting the passbands of the hybrid filters in the transmit and receive paths. No separate modulator or carrier frequency is required other than the gate drive signal which alone here provides the full required frequency spectrum.

Accordingly, it is an object of the present invention to provide a combination hybrid, switching, and frequency division multiplexing circuit which preserves the inherent advantages of the resonant transfer hybrid disclosed in application Ser. No. 349,572, including nearly lossless energy transfer in a simple, highly effective, and dependable structure having a minimum number of additional parts to obtain the desired additional swiching and frequency division multiplexing functions.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

DETAILED DESCRIPTION OF THE INVENTION

Figure 1:
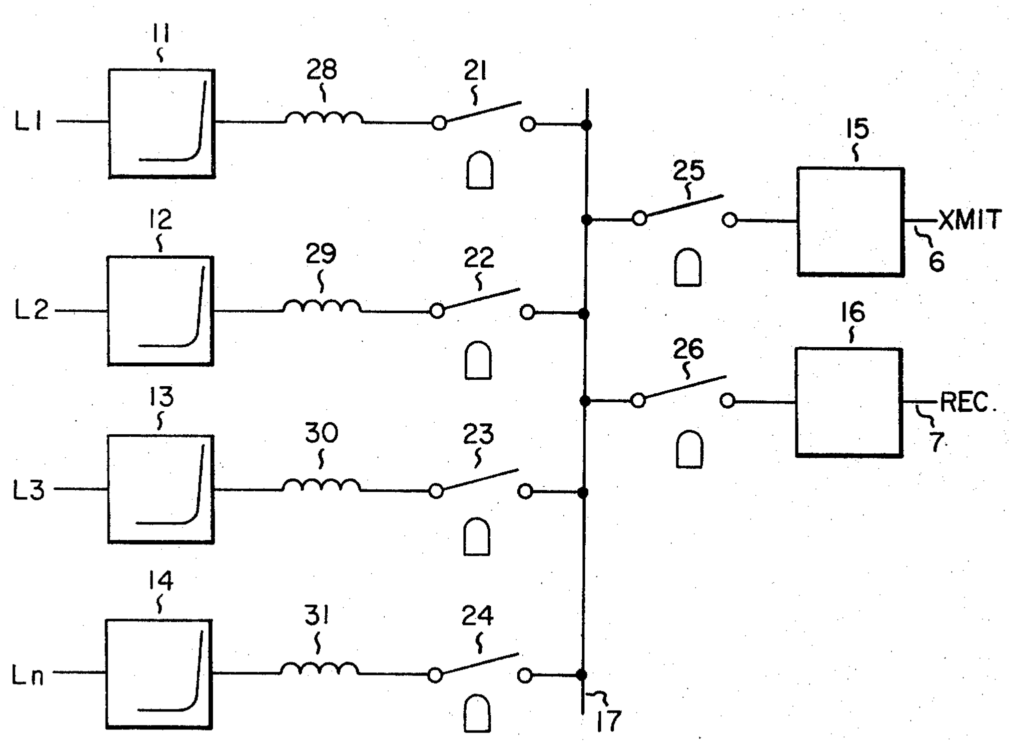
FIG. 1 is a schematic block diagram of a combination hybrid and switching circuit constructed in accordance with the present invention.
Figure 6:
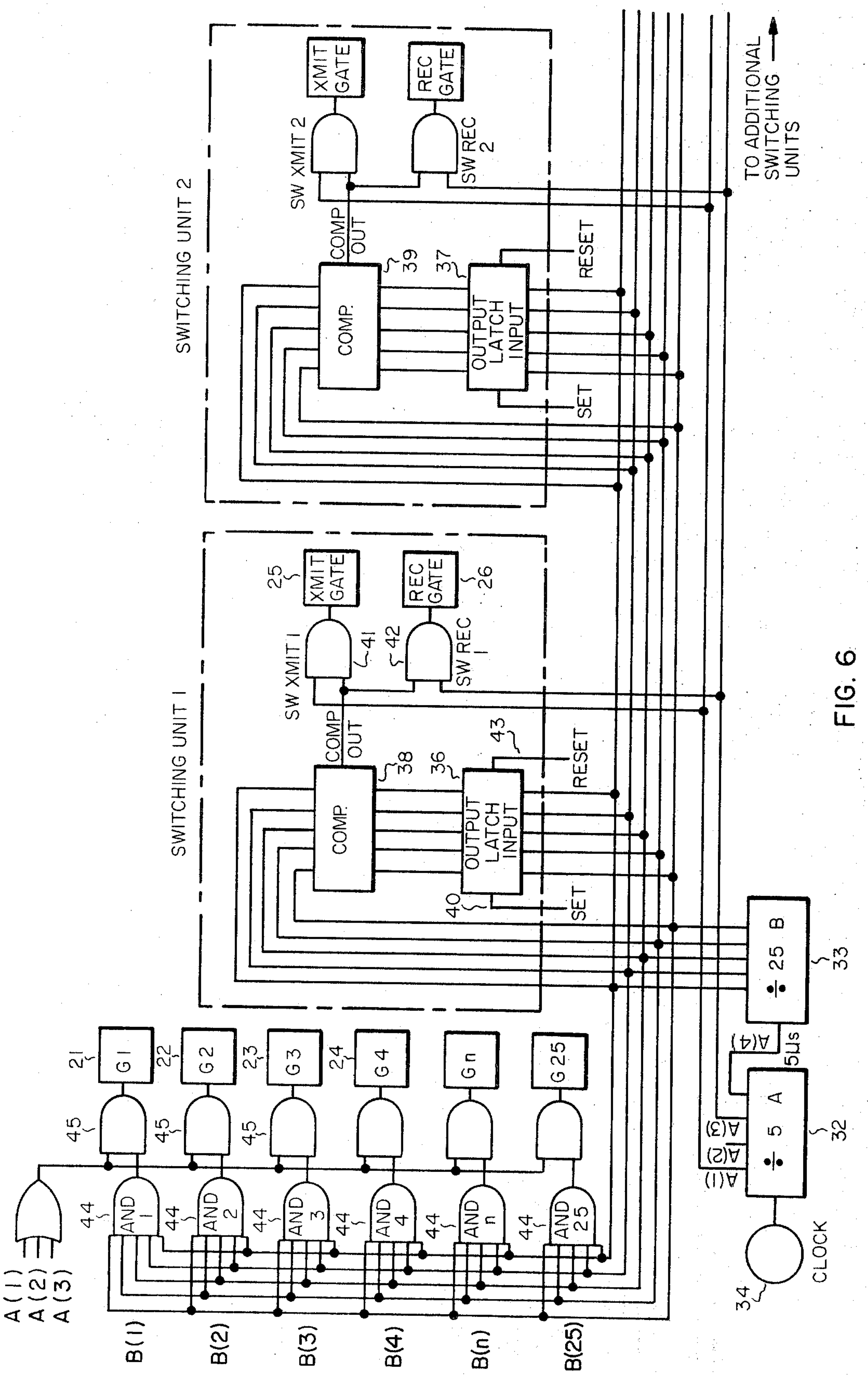
FIG. 6 is a schematic block diagram of a gate driving circuit.

A combination hybrid and switching circuit constructed in accordance with the present invention for a two-way communications system is illustrated in FIG. 1 and comprises briefly a plurality of lines L1, L2, L3, and Ln and a plurality of hybrid transmit and receive paths 6 and 7 to be selectively connected to lines L1 – Ln; a plurality of electric charge storage devices 11, 12, 13, 14, 15, and 16 designed for operation in a resonant transfer mode and connected one in each line L1 – Ln and one in each path 6 – 7; common bus means 17 connecting the lines and paths; series connected resonant transfer line and path gates 21, 22, 23, 24, 25, and 26 connected between each line device 11 – 14 and each path device 15 – 16 and bus means 17; and means, see FIG. 6, closing and opening gates 21 – 26 at a sampling frequency in accordance with the Nyquist theorem, and sequentially operating the line gates to place their closure periods in spaced time slots (FIG. 2) occurring within the sampling period and with only one line closed at a time, and closing and opening the path gates 25, 26 in sequence with their closed periods timed for resonant transfer and the closure of the receive path gate closely following the opening of the transmit path gate, and finally providing synchronized closing of selected line and path gates. To complete each resonant transfer circuit, a resonant transfer inductor 28, 29, 30, and 31 is connected between each storage device 11 – 14 and its associated gate 21 – 24.

Figure 2:
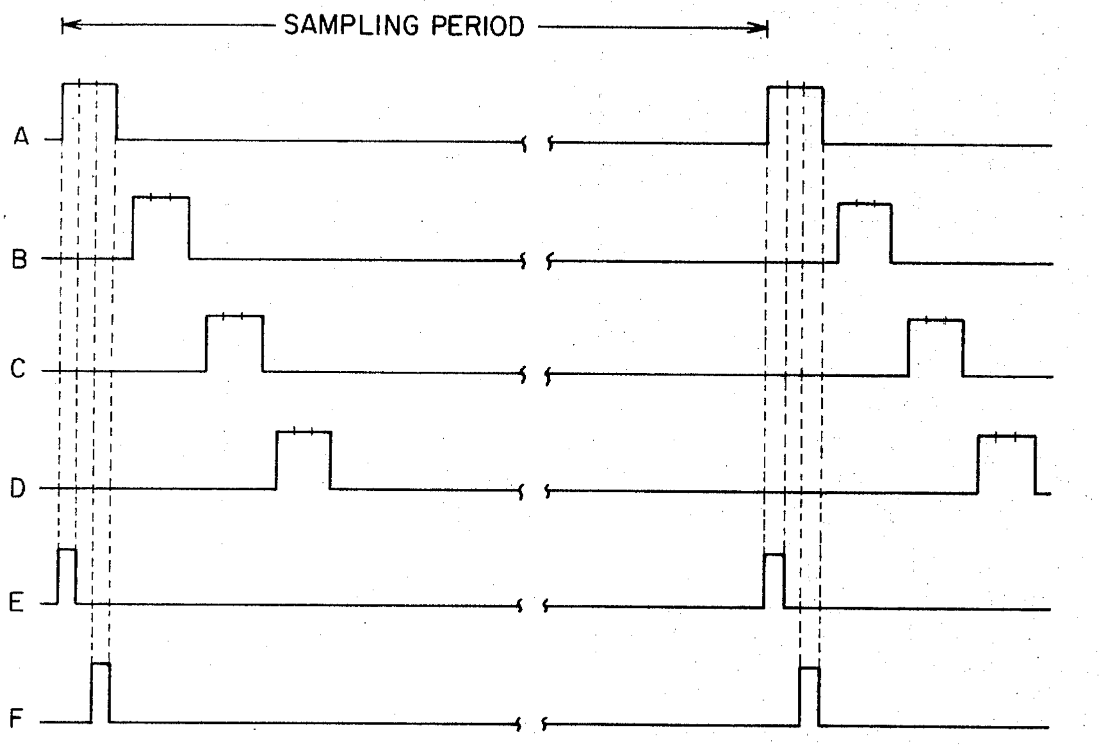
FIG. 2 is a chart showing a series of related wave forms employed by the circuit of FIG. 1.

The sequential and coordinated operation of gates 21 – 26 is illustrated in FIG. 2. The functioning of gate 21 is illustrated at graph A wherein it will be noted that gate 21 is closed briefly at the start of the sampling period and is open for the balance of the period. For voice frequency communication having a high frequency cutoff at 4,000 Hz, the sampling period may be taken at 125 microseconds in accordance with the Nyquist theorem. Approximately 1.25 microseconds is required to effect resonant transfer, i.e., on closing of gates 25 and 26, see graphs E and F. In accordance with the present invention, receive gate 26 (graph F) is closed as closely following as possible without significant overlap after the opening of transmit gate 25 (graph E). Because the present state of the art does not permit instantaneous opening and closing of the gates, a guard period of about 1.25 microseconds is provided between the opening of gate 25 and the closing of gate 26, compare graphs E and F. Since in accordance with the present invention line gates 21 – 24 will be closed during the time gates 25 and 26 are closed, in order to effect resonant transfer, the closure period of line gates 21 – 24, see graphs A, B, C, and D, will be about 3.75 microseconds. As further noted in the foregoing, the line gates 21 – 24 are sequentially operated so as to place their closure periods in spaced time slots occurring within the sampling period and with only one line closed at a time. Allowing a 1.25 microsecond guard period between line gate closures, a line gate closure of 3.75 microseconds may be obtained every five microseconds. Thus, a total of 25 lines may be sequentially switched within a sampling period of 125 microseconds.

Hybrid line separation is obtained in the present invention as more fully developed in application Ser. No. 349,572, by first closing gates 21 and 25 so as to cause a resonant transfer of the signal charge from device 11 to device 15. Immediately upon effecting such resonant transfer gate 25 opens and gate 26 closes so as to effect a return resonant transfer of the signal charge from device 16 to device 11. Since all of the lines and paths are interconnected by bus 17, this resonant hybrid transfer may be accomplished between any of the lines and the transmit and receive paths 6 and 7 of the hybrid by the simple expedient of synchronizing the operation of gates 25 – 26 with a selected line gate 21 – 24. For example, the circuit operation as illustrated in FIG. 2 places line L1 in operating relationship with the hybrid since it will be observed that the closing of gates 25 and 26 (graphs E and F) occurs synchronously with the closing of gate 21 (graph A). It will be observed that by delaying the closing of gates 25 and 26 by five microseconds, line L2 will be operatively connected to the hybrid; and by similar five microsecond delays the hybrid may be connected to any of lines L1 – Ln in the system. This switching capability is here accomplished by the simple addition (over the basic hybrid circuit of application Ser. No. 349,572) of a single gate 21–24 in each of the lines. Since only one line gate 21–24 is closed at a time, it will be understood that a plurality of hybrids may be connected to bus 17 in the configuration shown in FIG. 1 with the several hybrids connected to different lines. In ordinary carrier concentrator systems a ratio of about four lines per hybrid may be used. In telephone switching central office systems a ratio of about ten to one may be used.

As discussed in application Ser. No. 349,572, electric storage devices 11 – 16 may commonly be filters designed for operation in a resonant transfer mode. Where lines L1 – Ln are only required to handle voice frequency signals as when comprising subscriber pairs, or being connected to subscriber loop circuits, or to switching equipment in the central office, filters 11 – 14 will be lowpass filters having a high frequency cutoff of about 4 kHz. However, frequencies on lines L1 – Ln do not necessarily have to be voice frequency. Each of the lines may carry a group of signals in a wider frequency spectrum, for example 60 to 108 kHz (12 channel group). Filters 11 – 14 in such case will be bandpass filters of corresponding frequency handling capacity. Filters 15 and 16 in the hybrid paths may have a corresponding bandpass for connection to the central office, radio transmitter, high frequency line, or the like. The bandpass width is related, as will be understood, to the number of time slots which may be obtained in the switching as above explained.

All of the circuits are here illustrated in conventional single wire form. As will be understood, each line L1 – Ln in fact comprises a pair of conductors, and similarly each of the hybrid transmit and receive paths 6 – 7 comprise a pair of conductors. This single wire configuration is shown for simplicity and is well understood in the art. The present circuit is commonly referred to as a two-wire/four-wire hybrid. For a fuller disclosure of the two-wire/four-wire implementation see application Ser. No. 349,572.

A gate driving circuit for sequentially closing 25 line gates G1 – G25 is illustrated in FIG. 6. Gates G1, G2, G3, and G4 correspond with gates 21 – 24 of FIG. 1. Each closure interval is 3.75 microseconds and the various closure intervals are designated as B(1), B(2), . . . B(25) with B(1) assigned to gate G1 and B(25) assigned to gate G25. The B intervals are generated by a 1.25 microsecond clock 34 which is connected to a "divide-by-four". A counter 32 having outputs A(1), A(2), A(3) and A(4). Output A(4) is connected to a "divide-by-25" B counter 33. The 25 words B(i) out of the B counter are therefore each of 5 microseconds duration. The other outputs of A counter 32 are also used. The first pulse following the A(4) (B counter clock pulse) is designated as A(1). This pulse is the timing interval during which the transmit gates on the four-wire side may be closed. Pulse A(3) is the interval during which the receive gates on the four-wire side may be closed. Pulse A(2) is not used and provides a 1.25 microsecond guard interval between the transmit gate and receive gate closures. The readout of the "divide-by-25" counter 33 to form the words B(1) through B(25) by means of gates 44 is as conventionally done with counter readout. The illustration in FIG. 6 shows the matrix connecting the counter output leads to the gates 44 symbolically. Although various types of counters can be used in FIG. 6, a pseudo-random counter similar to that described in "Digital Communications with Space Applications" by S. Golomb has been chosen for illustration of counter 33. The interconnection of gates 44 to counter 33 for the pseudo-random type counter would be in accordance with the truth table of FIG. 8. In order to simplify the diagram and truth table, FIGS. 6 and 8, respectively, only one logic state is indicated. The "not" state is not given for the Table FIG. 8 and only five output leads are shown for 33 of FIG. 6. Note that other logic arrangements could be employed to perform the desired interconnections.

In order to provide the switching function between the two-wire ports and the four-wire ports it is necessary to be able to close the transmit and receive gates 25 and 26 for an arbitrary four-wire pair within the interval B(n) assigned to the two-wire gate to which the connection is desired. This is done by the switching units shown in FIG. 6. Two of such units are here shown, although more may be added.

Figures 7, 8:
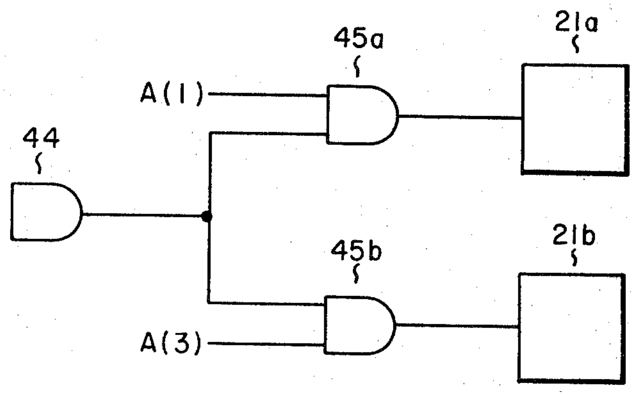
FIG. 7 is a fragmentary schematic block diagram.
FIG. 8 is a truth table for a pseudo-random counter.

The switching units act as follows. Suppose that two-wire channel B(n) is to be switched to four-wire channel 1. The B counter 33 words B(1) through B(25) appear sequentially at the inputs of latches 36 and 37 in the parallel connected switch units. Latches 36 and 37 may be standard commercially available 4-bit latches, similar to Fairchild semiconductor model 9308, or they can be constructed from standard integrated circuit gate and flip-flop packages. When word B(n) appears on the latch input bus a logic 1 is applied to switch unit 1 latch set lead. This enters word B(n) in the latch. The nature of the latch is such that word B(n) appears at the latch output and the latch ignores all other words at its input until it receives a signal at its reset lead. It will be noted that the B(i) sequence is continuously applied to one side of all of comparators 38 and 39 incorporated in the switching units. Comparators 38 and 39 are commercially available logic units, similar to Fairchild semiconductor model 4510 dual 4-bit comparator, or they can be constructed from standard integrated circuit gate and flip-flop packages. Thus, the comparators continuously compare the B counter word with the words stored in the associated latch. When there is a coincidence, the comparator produces a logic 1 output which enables the associated logic to switch the four-wire gates 25 – 26. The enable condition is completed by the A(1) and the A(3) signals applied to logic gates 41 and 42 connected as illustrated. The A(1) pulse controls the transmit gate and the A(3) pulse controls the receive gate. Thus, the gates associated with switching unit 1 are actuated each time word B(n) appears, but are not actuated during any other B(i) interval. Various types of counters may be used for counters A and B. Normally, counter B will have 10 output leads connected by a conventional logic matrix to the 25 AND gates 44 to read out the 25 B counter words, B(1) – B(25) in consecutive 5 microsecond time slots. AND-gates 44 are, in turn, connected by gates 45 to the 25 line gates G1 – G25. The matrix connections between gates 44 and the B counter are symbolically illustrated. These connections are made in accordance with a truth table related to the counter design. A typical truth table is shown in FIG. 8. Gates 45 are partially enabled by the OR gate 59 which has a ONE output during the A(1), A(2), A(3) interval in accordance with the timing shown in FIG. 2. A particular gate 45 is completely enabled when it has a ONE input from the connected gate 44 as well as from gate 59. Thus, gates 21, 22, 23, 24, etc. close sequentially in accordance with FIG. 2.

Figure 3:
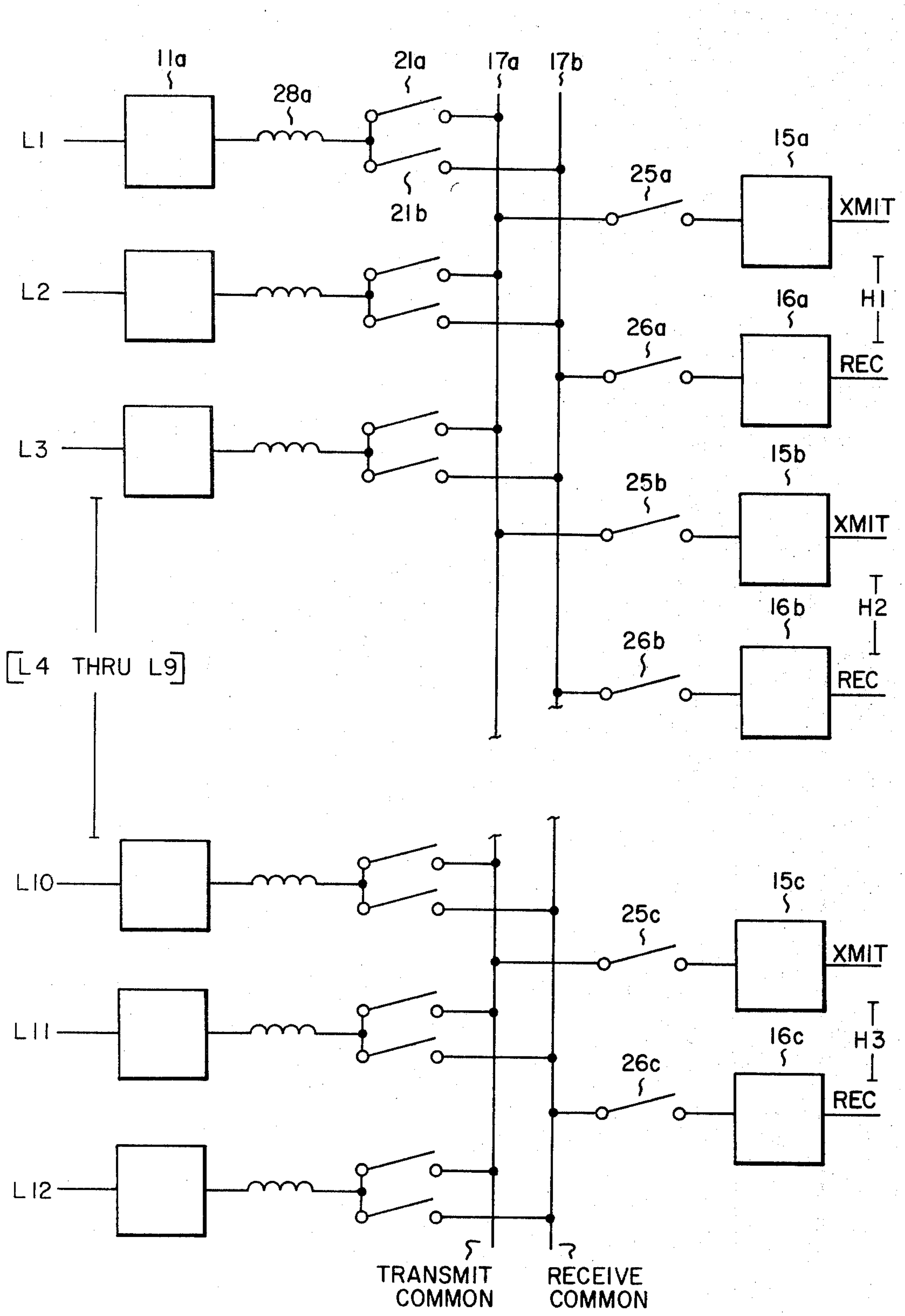
FIG. 3 is a schematic block diagram of a modified form of the invention having a plurality of lines and hybrids.

A modified form of the invention is illustrated in FIG. 3 wherein both additional lines and additional hybrids are illustrated, and separate common buses 17*a* and 17*b* are used for the several transmit and receive paths of three four-wire hybrids H1, H2, and H3 as here shown. Twelve line connections L1 – L12 are shown conforming to the typical line hybrid ratio for a carrier concentrator. An electric charge storage device or filter, such as 11*a*, is connected in each of the lines in series with a resonant transfer inductor 28*a* and a pair of parallel connected gates 21*a* and 21*b* which are in turn connected to common buses 17*a* and 17*b*, respectively. As above noted, bus 17*a* provides a common transmit bus, and hybrid transmit path gates 25*a*, 25*b*, and 25*c* are connected thereto and to the transmit path storage device or filter 15*a*, 15*b*, and 15*c*. In a similar fashion, the hybrid receive path gates 26*a*, 26*b*, and 26*c* are connected to common bus 17b and to receive path storage device or filter 16*a*, 16*b*, and 16*c*. By separating the common transmit and receive buses the interval between pulses on the buses is increased and therefore the circuit is less prone to crosstalk and may be preferred in certain instances. To accomplish this separation of the buses a second gate 21*b* is connected in each of the lines L1 – L12 and is operated in synchronism with the receive path gate of the hybrid selected for connection to the line.

Figure 4:
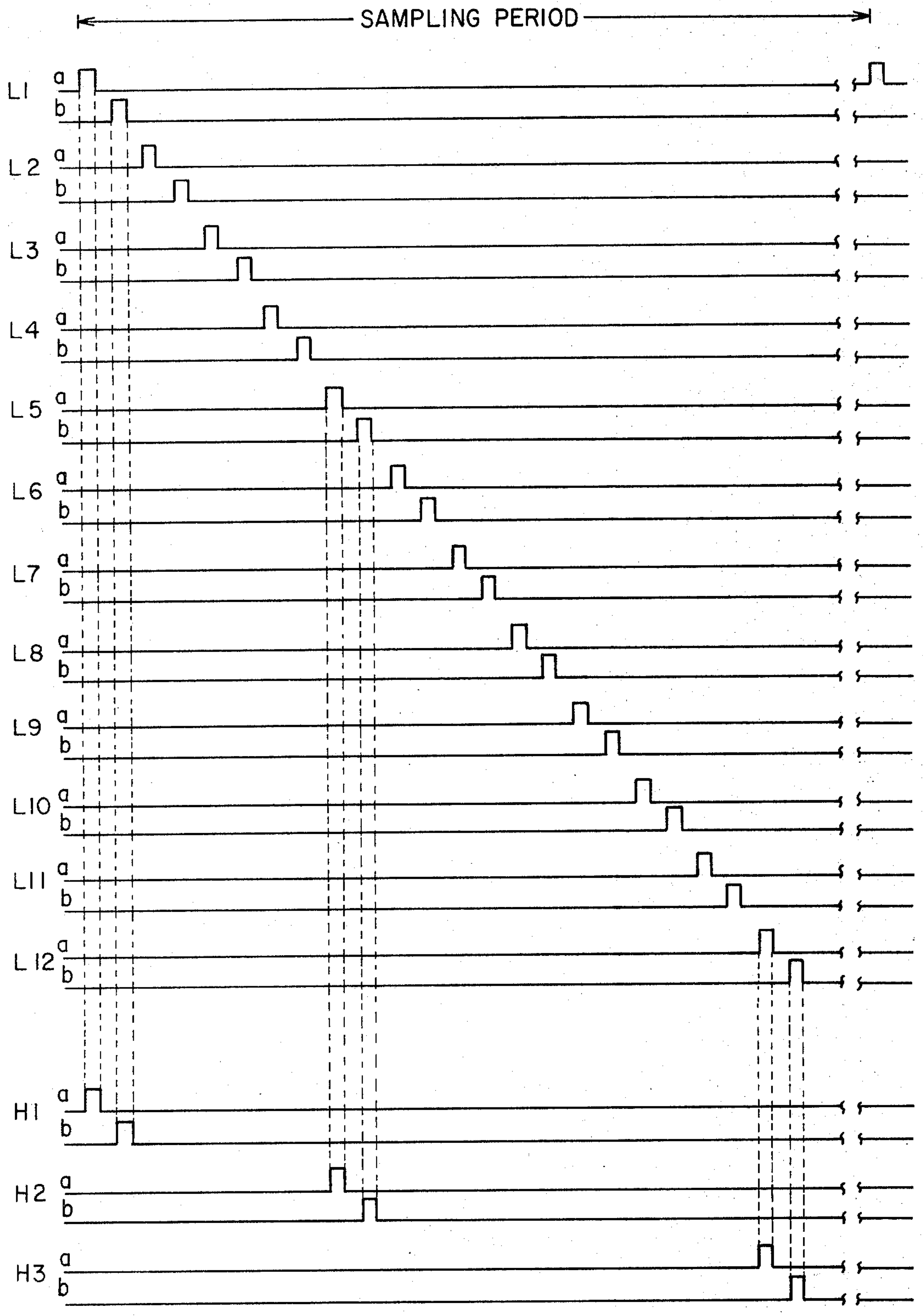
FIG. 4 is a chart showing a series of related wave forms used by the circuit of FIG. 3.

The operation of the line and hybrid path gates for the embodiment of FIG. 3 is illustrated in FIG. 4. For purposes of description, the letter A is assigned to a transmit gate of each line, and the letter B is assigned to the receive gate of each line. In FIG. 4, line gate L1a is shown closed for a brief interval at the start of the sampling period. This closure interval is timed to provide resonant transfer and is on the order of 1.25 microseconds. Receive gate L1b closes closely after gate L1*a* opens and has a closure timed for resonant transfer. A small guard interval is provided between the opening of gate a and the closure of gate *b* to accommodate for the operation of the gates. Ideally, this delay would be zero. Practically, it can be held to about 0.5 to 1.25 microseconds. It will be further noted that promptly following the opening of gate L1b, gate L2*a* closes and the sequence is repeated with all of the line gates operated in sequential fashion during the sampling period and with only one line gate closed at a time.

Any of the hybrids H1, H2, or H3 may be connected to any of the lines by synchronizing the operation of the transmit and receive path gates of the selected hybrid with the a and b gates of the selected line. In FIG. 4, the letter a is assigned to the operation of the transmit gate and the letter b to the operation of the receive gate in the respective paths of hybrids H1, H2, and H3. If gate H1*a* is operated in synchronism with line gate L1*a* and gate H1*b* in synchronism with line gate L1*b*, hybrid H1 will be connected to line L1 as depicted in FIG. 4. At the same time hybrids H2 and H3 may be connected to other lines. For example, in FIG. 4, hybrid H2 is shown connected to line L5 and hybrid H3 is shown connected to line L12.

It will be noted that in the embodiment illustrated in FIGS. 3 and 4 the collective closure time of line gates *a* and *b*, with a 1.25 microsecond guard period, is 3.75 microseconds corresponding to the 3.75 microsecond closure of the line gates in the embodiment of FIGS. 1 and 2. With additional guard periods provided between closing of gates of the several lines, say of 1.25 microseconds, the line channels are spaced apart in 5 microsecond time slots as in the first described embodiment.

The drive circuit illustrated in FIG. 6 may be readily modified to accomplish the succesive closures of the line gates. A simple method for doing this is to add a pair of AND gates 45*a* and 45*b* as illustrated in FIG. 7 for driving line gates 21*a* and 21*b* and connecting these two AND gates 45*a* and 45*b* to gate 44 (FIG. 6) and to the A counter outlets A(1) and A(3).

An important feature of the present invention is that the resonant transfer hybrid and switching combination hereinabove described will also provide a modulation process enabling frequency division multiplexing thereby combining all three functions in a carrier-concentrator multiplex system. This added function is derived from two characteristics of the basic hybrid switching circuit. The first is that the signals at the transmit and receive ports need not be at the same frequency as the line signal. The second is that the signals in the transmit and receive paths will not only have the basic information of their counterparts in the line signal, but the respective transmit and receive signals will repeat at sidebands at multiples of the sampling frequency. Accordingly, by the simple use of bandpass filters for the resonant transfer electric charge storage devices in the hybrid paths and by selecting such filters to have passbands distributed at multiples of the sampling frequency, frequency division multiplexing may be obtained. As further disclosed in application Ser. No. 392,720, the selection of the particular time displacement of operation of the transmit and receive gates at theoretically zero microseconds enables the use of all types of resonant transfer filters including the specific impulse response zero type heretofore used. Also resonant transfer hybrid circuits heretofore used have proposed only lowpass-to-lowpass filter operation. Accordingly, there is obtained in the present invention the combination of nearly lossless transmission of energy and the use of the passband array in the transmit and receive paths which affords frequency division multiplexing.

Figure 5:
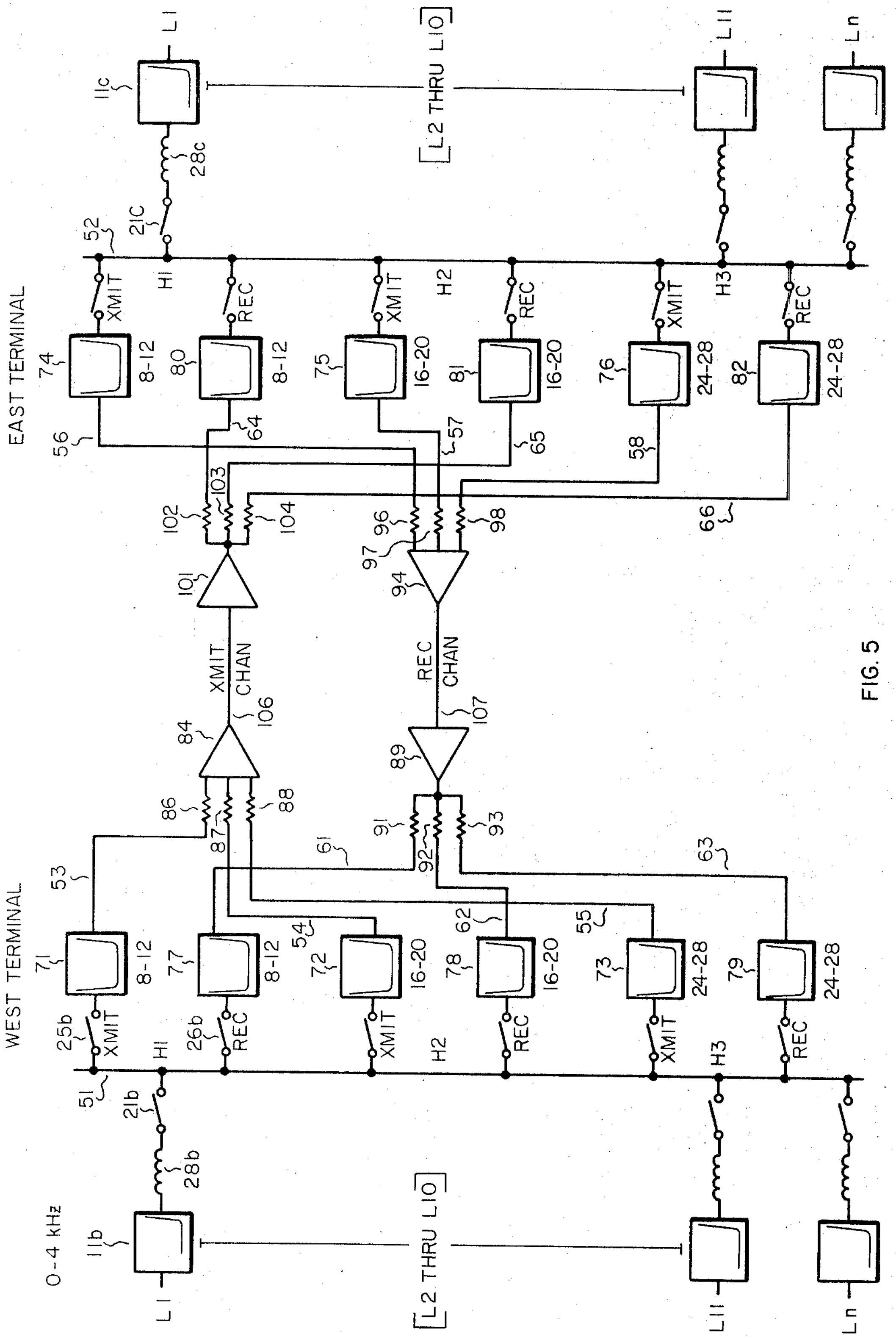
FIG. 5 is a schematic block diagram of a further modified form of the invention.

A two terminal carrier-concentrator multiplex system is illustrated in FIG. 5. A plurality of lines L1 – Ln are illustrated at both a West terminal and an East terminal. These lines are connected to common buses 51 and 52, corresponding to bus 17 at FIG. 1, through charge storage devices 11*b* and 11*c*, resonant transfer inductors 28*b* and 28*c*, and gates 21*b* and 21*c* corresponding with device 11, inductor 28, and gate 21 of FIG. 1.

Three hybrids are shown at each terminal having transmit paths 53, 54, and 55, West terminal and 56, 57, and 58, East terminal; and receive paths 61, 62, and 63, West terminal and 64, 65, and 66, East terminal. Connected in the transmit paths 53 – 58 are bandpass filters 71, 72, and 73, West terminal and 74, 75, and 76, East terminal. Connected in receive paths 61 – 66 are bandpass filters 77, 78, and 79, West terminal and 80, 81, and 82, East terminal. The several outputs of filters 71, 72, and 73, by reason of the modulation hereinabove explained, may be connected, and are here shown connected, to the input of a common amplifier 84, the line connections here being made through terminating resistors 86, 87, and 88. In a similar manner, the inputs of filters 77, 78, and 79 may be connected to the output of a common amplifier 89 through terminating resistors 91, 92, and 93. The connections are similarly repeated at East terminal where the outputs of filters 74, 75, and 76 are connected to the input of a common amplifier 94 through a terminating resistors 96, 97, and 98; and the inputs of filters 80, 81, and 82 are connected to the output of a common amplifier 101 through terminating resistors 102, 103, and 104.

A common transmit channel 106 is thus obtained between amplifiers 84 and 101 and a common receive channel is obtained between amplifiers 94 and 89.

In this embodiment, line filters 11b and 11c may be, and are here illustrated as, lowpass filters. These may of course in appropriate circumstances be bandpass filters, a lowpass voice frequency line of 0 – 4 kHz is taken here for illustration. Bandpass filters 71 – 82 may be either of the single sideband or double sideband type. For purposes of illustration, single sideband filters are shown as follows:

| Filter Nos. | Passband kHz |
|---|---|
| 71, 74, 77, 80 | 8 – 12 |
| 72, 78, 75, 81 | 16 – 20 |
| 73, 63, 76, 82 | 24 – 28 |

In the arrangement as described, both the common transmit channel and the common receive channel will have a bandwidth of 8 – 28 kHz. If desired, and as more fully explained in application Ser. No. 392,720, bandpass filters 71 – 82 may be selected so that the transmission paths of West terminal and receive paths of East terminal will collectively occupy a low portion of the frequency spectrum, say 8 – 28; and the receive paths, West terminal, and transmit paths, East terminal, will collectively occupy a higher portion of the frequency spectrum such as 32 – 52 kHz whereby the two channels may be combined in a single high frequency line. Alternatively, either of the groups may be independently modulated to a different portion of the frequency spectrum. A 4 kHz guard band may be used as here suggested between the channels to permit use of the simplest and most inexpensive filters.

Alternatively, the use of more complex filter design and reduction or deletion of the guard band will permit increasing the number of channels.

It will be observed that the line connections between West terminal and East terminal will be made through common hybrids. Thus, if line 1, West terminal, is to be connected to line 5, East terminal, the initiation of the call will first require by circuitry well known in the art for connection of line 1 to an open, i.e., not in use, hybrid. If, for example, line 1 is connected to hybrid H2, such information will be sent to East terminal via a data train and by circuitry well known in the art to connect line 5 with hybrid H2. If both hybrid H2 and line 5 are open, i.e., not in use, the call will be completed. The identifying information only needs be transmitted at the initiation of the connection. No other synchronizing or other pulse train information is required since the line signals are continuous analog signals and the only requirement is that the same two/four-wire connection be made at each end.

As above noted, the several lines of the West terminal may represent subscriber loops or central office terminations of the several lines of the East terminal, that is, line L1, West terminal, may be the central office terminal for line 1, East terminal. In the latter case, the several lines of East terminal may represent subscriber loops. In such case, a subscriber in the vicinity of West terminal desiring to call subscriber L1, East terminal, would dial terminal L1, West terminal. The logic circuitry, West terminal, would then search for an open hybrid H1 – H3 and complete the connection by synchronizing the operation of the hybrid gates with the gate of line L1 by the structure hereikabove described. At the same time, a data train is sent from West terminal to East terminal indicating the particular hybrid connected to terminal 1; and the circuitry as depicted in FIG. 6 will accept the information and effect connection of subscriber line L1 with the particular hybrid selected.

What is claimed is:

1. A combination hybrid and switching circuit for a two-way communications system having a plurality of lines and hybrid transmit and receive paths to be selectively connected to said lines and comprising:

a plurality of electric charge storage devices designed for operation in a resonant transfer mode and connected one in each said line and in each said path;

common bus means connecting said paths;

series connected resonant transfer line and path gates connected between each line device and each path device and said bus means; and means closing and opening said gates at a sampling frequency equal to at least two times the highest line frequency of interest and sequentially operating said line gates to place their closure periods in spaced time slots occuring within the sampling period and with only one line closed at a time, and closing and opening said path gates in sequence with their closure periods timed for resonant transfer and the closure of said receive path gate occurring as closely following as possible without significant overlap after the opening of said transmit path gate, and providing synchronized closing of selected line and path gates.

2. A circuit as defined in claim 1, the closing period of said line gates being at least equal to the time required for, and including periods of, successive closures of said path gates.

3. A circuit as defined in claim 1 having a plurality of hybrid transmit and receive paths, said bus means comprising:

a first bus connecting each of said transmit paths;

a second bus connecting each of said receive paths;

a pair of said line gates being connected in parallel to each said line device and connected one to said first bus and the other to said second bus; and, said gate operating means providing synchronized operation of a selected one of said pairs of gates with the transmit and receive paths of a selected hybrid.

4. The circuit as defined in claim 1 and having a plurality of hybrid transmit and receive paths, said path devices comprising bandpass filters having passbands distributed at multiples of said sampling frequency and being connected to provide frequency division multiplexing of said paths.

5. The circuit of claim 4, each of said line devices comprising a lowpass filter.

6. A circuit as defined in claim 4:

a common transmit channel connected to the outputs of said bandpass filters in said transmit paths; and, a common receive channel connected to the inputs of said bandpass filters in said receive paths.

7. The circuit of claim 6:

an amplifier having an input connected to said filter outputs in said transmit path and an output connected to said common transmit channel; and, an amplifier having an input connected to said common receive channel and an output connected to said inputs of said receive path filters.

8. The circuit of claim 7: and, terminating resistors connected one between each transmit path and the input of said first named amplifier, and one between each receive path and the output of said second named amplifier.

9. A first terminal comprising the circuit of claim 6;

a second terminal having a plurality of second lines and second common receive and transmit channels connected to said first named transmit and receive channels, respectively;

a plurality of second bandpass filters having passbands corresponding with said first named bandpass filters and being connected to said second channels;

a plurality of second lowpass filters designed for operation in a resonant transfer mode with said second bandpass filters and connected one in each second line;

common bus means connecting said second lowpass filters;

series connected resonant transfer line and path second gates connected between each second lowpass filter and each second bandpass filter and said bus means; and, means closing and opening said second gates at a sampling frequency equal to at least two times the highest line frequency of interest and sequentially operating said second line gates to place their closure periods in spaced time slots occurring within the sampling period and with only one second line gate closed at a time, and closing and opening said second path gates in sequence with their closed periods timed for resonant transfer and the closure of said second receive path gates occurring as closely following as possible without significant overlap after the opening of said transmit path gates, and providing synchronized closing of selected second line and second path gates.

10. The method of obtaining a combination hybrid and line switching function in a two-way communications terminal having a plurality of lines and hybrid transmit and receive paths and common bus means connecting said lines and paths comprising:

effecting hybrid separation of said lines by resonant transfer between line filters and transmit and receive path filters by sampling gates in said lines and paths having a sampling frequency of at least two times the highest line message frequency of interest;

operating said line gates to place their closure periods in spaced time slots occurring within the sampling period and with only one line closed at a time;

closing and opening said path gates in sequence with their closure periods timed for resonant transfer and with the closure of said receive path gate occurring as closely following as possible without significant overlap after the opening of said transmit path gate; and, synchronizing the closing of selected line and path gates.

11. The method defined in claim 10 wherein said terminal is provided with a plurality of hybrid transmit and receive paths; and, providing separate common bus connections for said transmit and receive paths.

12. The method defined in claim 10 wherein said terminal is provided with a plurality of hybrid transmit and receive paths;

selecting passbands for at least certain of said transmit and receive path filters which differ from each other by multiples of said sampling frequency; and, connecting said paths to provide frequency division multiplexing.

13. The method defined in claim 12.

connecting the outputs of said bandpass filters in said transmit paths to a common transmit channel; and, connecting the inputs of said passband filters in said receive paths to a common receive channel.

14. The method as defined in claim 12:

connecting second common receive and transmit channels of a second terminal to said first named transmit and receive channels, respectively;

connecting to said second common channels a plurality of second bandpass filters having passbands corresponding to said first named bandpass filters;

effecting hybrid separation of a plurality of second terminal lines by resonant transfer between second line filters and said second bandpass filters by sampling gates having a sampling frequency of at least two times the highest line message frequency of interest;

providing a common connection between said second lines and second paths;

operating said second line gates to place their closure periods in spaced time slots occurring within the sampling period and with only one second line closed at a time;

closing and opening said second path gates in sequence with their closed periods timed for resonant transfer with the closure of said second receive path gates occurring as closely following as possible without significant overlap after the opening of said transmit path gates; and, synchronizing the closing of selected second line and second path gates.

* * * * *

UNITED STATES PATENT OFFICE
CERTIFICATE OF CORRECTION

Patent No. 3,836,720 Dated September 17, 1974

Inventor(s) Lawrence E. Getgen

It is certified that error appears in the above-identified patent and that said Letters Patent are hereby corrected as shown below:

At [73] change the assignee's name from "Armour-Moore Marine Service Limited, Surrey, England" to -- GTE Automatic Electric Laboratories, Incorporated, Northlake, Ill. --. Column 1, line 48, change "oppoite" to -- opposite --. Column 5, line 23, before "A counter" delete the period. Column 9, line 52, change "hereikabove" to -- hereinabove --.

Signed and sealed this 31st day of December 1974.

(SEAL)
Attest:

McCOY M. GIBSON JR.
Attesting Officer

C. MARSHALL DANN
Commissioner of Patents